(12) United States Patent
Habacker

(10) Patent No.: US 7,216,921 B2
(45) Date of Patent: May 15, 2007

(54) CABRIOLET VEHICLE COMPRISING A RETRACTABLE SOFT-TOP

(75) Inventor: Norbert Habacker, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 12 days.

(21) Appl. No.: 10/534,740

(22) PCT Filed: Nov. 6, 2003

(86) PCT No.: PCT/DE03/03679

§ 371 (c)(1),
(2), (4) Date: May 12, 2005

(87) PCT Pub. No.: WO2004/043723

PCT Pub. Date: May 27, 2004

(65) Prior Publication Data

US 2006/0043759 A1    Mar. 2, 2006

(30) Foreign Application Priority Data

Nov. 14, 2002 (DE) .............................. 102 52 987

(51) Int. Cl.
*B60J 7/20*    (2006.01)
(52) U.S. Cl. .................. 296/133; 296/107.08
(58) Field of Classification Search ................ 296/124, 296/131–134, 107.08
See application file for complete search history.

(56) References Cited

U.S. PATENT DOCUMENTS

| | | | |
|---|---|---|---|
| 5,197,778 A | 3/1993 | Burst | 296/136 |
| 5,975,619 A | 11/1999 | Dettling et al. | 296/107.08 |
| 6,595,574 B2 * | 7/2003 | Shaw et al. | 296/120.1 |
| 2002/0135201 A1 | 9/2002 | Liedmeyer et al. | 296/107.17 |

FOREIGN PATENT DOCUMENTS

| | | | |
|---|---|---|---|
| DE | 19912893 | * | 9/2000 |
| EP | 882615 | * | 12/1998 |

OTHER PUBLICATIONS

Furubetsupu Doushiyuu et al.; Hood Unit Housing Structure for Convertible Vehicle; Patent Abstracts of Japan; Jul. 12, 1984; Publication No. 06191285.

* cited by examiner

*Primary Examiner*—Dennis H. Pedder
(74) *Attorney, Agent, or Firm*—Gudrun E. Huckett

(57) ABSTRACT

A convertible vehicle has a carbody and a retractable top connected to the carbody. A top compartment is provided in the carbody, wherein the retractable top in a folded-down position of the retractable top is stowed in the top compartment. A top compartment lid for closing the top compartment is provided, wherein the top compartment lid extends within a rear carbody contour of the carbody. A holding-down device is arranged between the top compartment lid and the retractable top, wherein the holding-down device in a holding-down position is placed onto the retractable top stowed in the top compartment when closing the top compartment lid. The holding-down device has a counter member pivotably supported on the top compartment lid and a support part that is movable jointly with the retractable top and is connectable to the counter member in the folded-down position of the retractable top.

11 Claims, 5 Drawing Sheets

CABRIOLET VEHICLE COMPRISING A RETRACTABLE SOFT-TOP

BACKGROUND OF THE INVENTION

The invention relates to a convertible vehicle comprising a retractable top, in particular a folding top, comprising a top compartment receiving the top in its open position, wherein the top compartment is closable by a top compartment lid extending within the rear carbody contour, wherein between the lid and the top stowable within the top compartment a holding-down device is provided that can be placed onto the top upon closing the top compartment lid.

In convertible vehicles comprising a retractable top, in particular, a folding top, the top is stowed before driving with the top open, in a top compartment provided at the rear. In this position, the top is loaded by a holding-down device (DE 198 13 347 A1) that is provided on the top compartment lid and embodied as a shaped plastic part in order to keep away vibrations and unwanted loads from the sensitive roof skin during driving. In this connection, the shaped plastic part is secured by means of a fastening part on the underside of the top compartment lid such that the stationary shaped part can be transferred only by a point-precise simple pivot movement into the contact position and a movement of the top compartment lid that comprises also pushing components would cause disadvantageous friction loads in the area of the surfaces at the holding-down device that rest against one another.

The invention concerns the problem of providing an improved folding top for a convertible vehicle whose holding-down device is adjustable with minimal technical expenditure to a pivot-push movement of the top compartment lid and enables, while gently realizing a connection, a optimal securing of the folded-down top.

SUMMARY OF THE INVENTION

Based on a convertible vehicle of the aforementioned kind, the invention solves this problem in that the holding-down device comprises a counter member supported on the top compartment lid and a support part movable with the top and connectable to the counter member in the folded-down position of the top. With regard to important additional configurations, reference is being had to the dependent claims.

The convertible vehicle is provided in accordance with the inventive embodiment with a two-part holding-down device whose counter member that is movably supported on the top compartment lid can be connected to the support part in the folded-down position of the top. The counter member can be supported on the top compartment lid so as to be pivotable and/or pushable such that in a connecting position connected to the support part a pushing movement component, generated by the opening or closing kinematic mechanism in addition to the pivot movement, can be deflected without loading the top and, in this way, the two-part holding-down device can be adjusted with minimal expenditure to the kinematic drive mechanism of a top compartment lid, respectively.

In a pivoting phase that is reached when closing the top compartment lid, the support part that has already been positioned by providing the open position of the folding top is brought into connecting engagement with the counter member such that the latter, upon further movement of the top compartment lid, is guided by the support part and can be pivoted relative to the top compartment lid. With this phase-wise joint movement of the top compartment lid and of the counter member embodied as a pivot support, a functional connection of the components that are movable for top control is achieved with minimal expenditure. In this way, the holding-down device according to the invention can be employed for different automatic drive concepts.

The two-part holding-down device is designed by means of appropriate adjusting possibilities in the area of the counter member such that for different roof configurations an optimal holding-down function with minimal load of the components is achievable. The counter member that is configured as a pivot support can be positioned relative to the support part such that with minimal pressure forces the load on a sensitive roof skin of the stowed top is reduced and vibrations that are introduced by the driving loads into the vehicle are dampened on the top by the holding-down device.

BRIEF DESCRIPTION OF THE DRAWINGS

Further details and advantages of the invention result from the following description and the drawings that illustrate one embodiment of the top according to the invention in the form of a folding top in more detail. The drawings show in.

DESCRIPTION OF PREFERRED EMBODIMENTS

Figure 1:
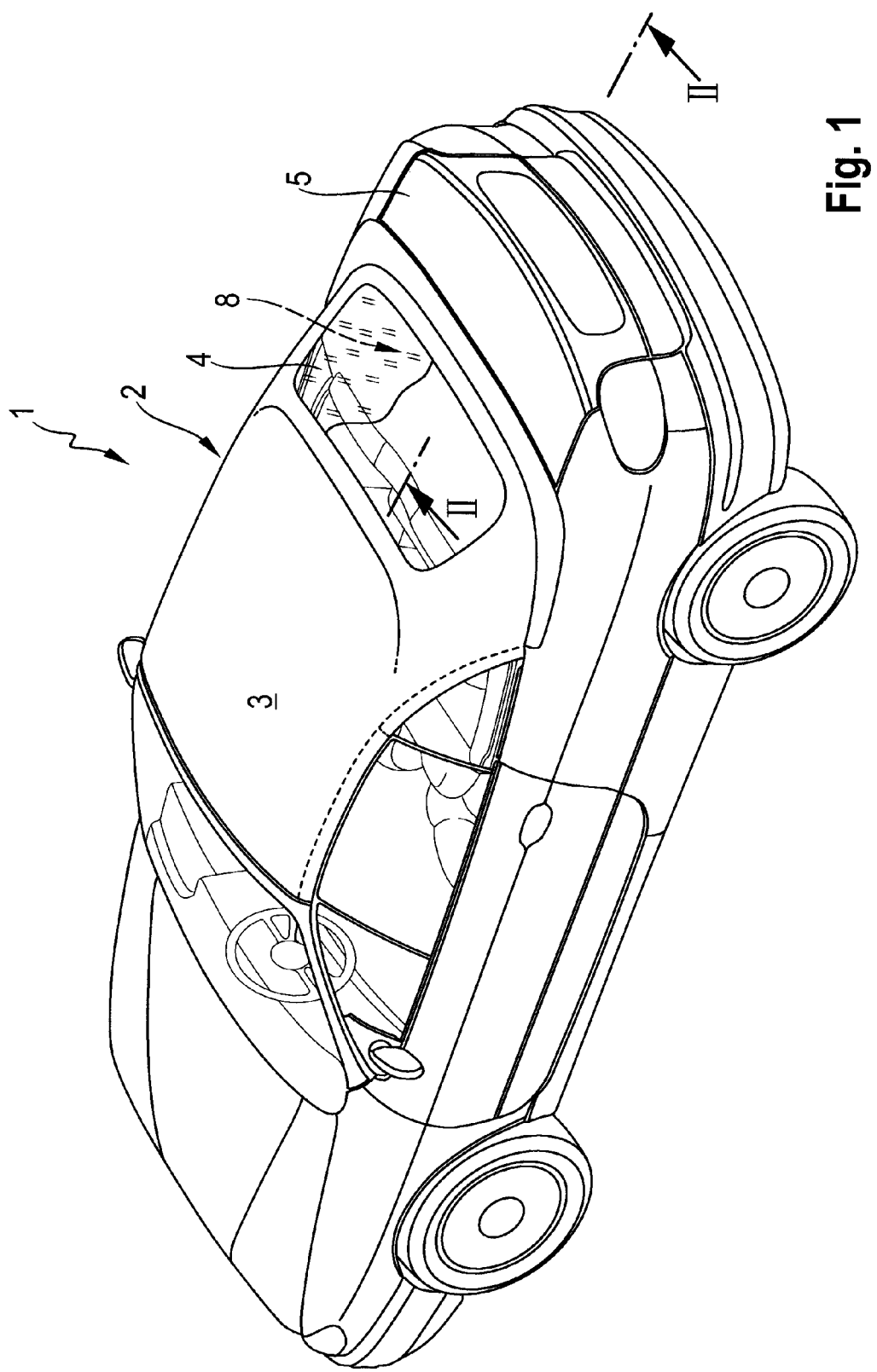
FIG. 1 a perspective rear view of a convertible vehicle with its folding top in the closed position.
Figure 2:
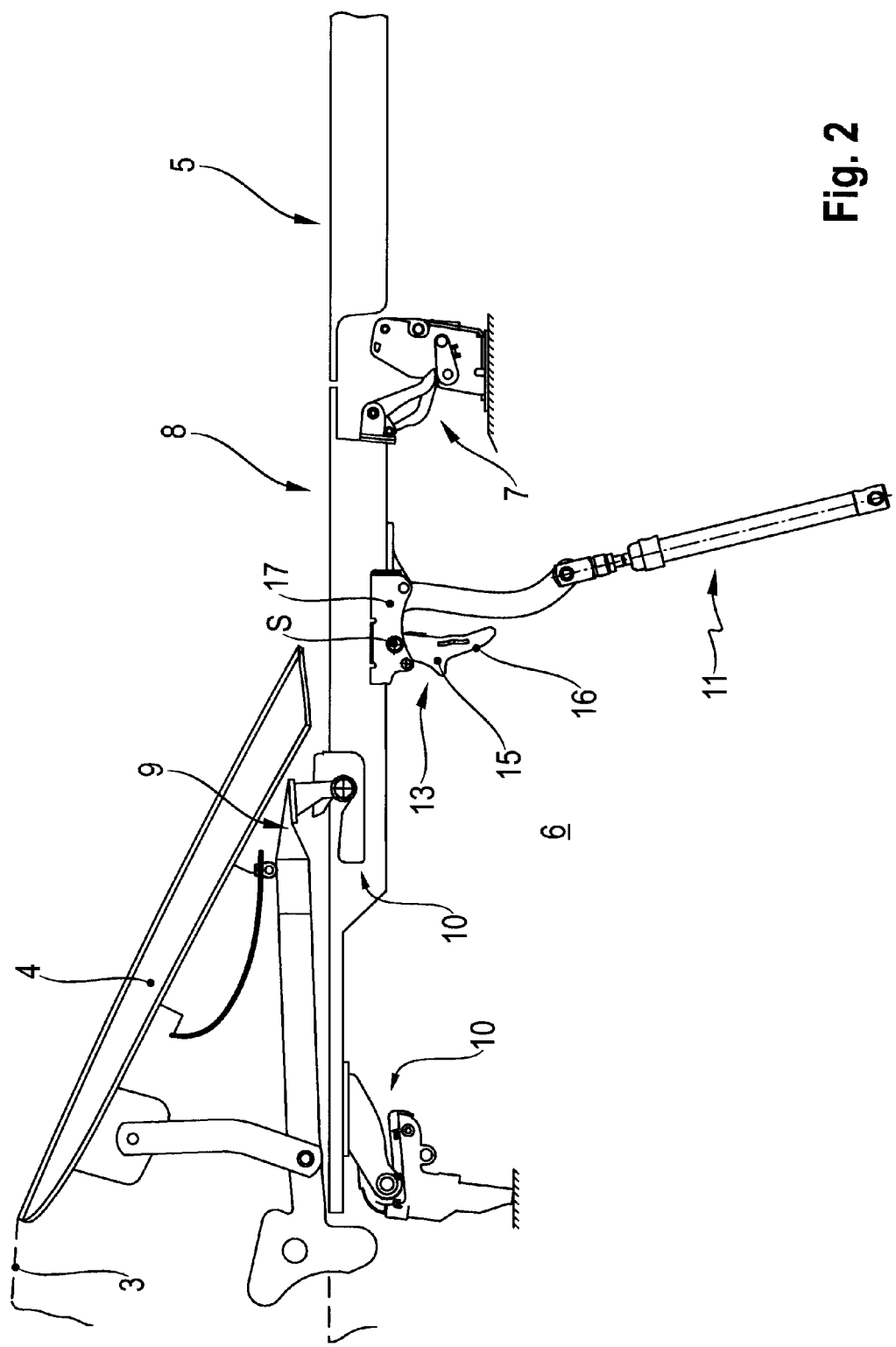
FIG. 2 a schematic cross-sectional illustration of the rear area of the vehicle according to a line II—II in FIG. 1.

In FIG. 1, the convertible vehicle identified as a whole at 1 is illustrated in a perspective view wherein its folding top 2 that is in the closed position comprises a rear window 4 positioned rearwardly in the area of the roof skin 3 that extends across the passenger compartment. The rear area of the roof skin 3 rests below the rear window 4 on the top compartment lid 8 (FIG. 5) that is positioned together with the trunk lid 5 substantially within a common plane. By means of this top compartment lid 8 that extends essentially U-shaped within the rear carbody contour, the top compartment 6 for receiving the top 2 can be closed.

The top compartment lid 8 is pivotably supported on the carbody by means of hinge devices 7 (and 7', not illustrated in the side views of FIGS. 2 to 5) that are positioned opposed to one another mirror-symmetrically to the longitudinal center plane M of the vehicle, respectively. The top compartment lid 8 cooperates forwardly in the traveling direction of the vehicle with at least one locking device 10 provided in the area of a laterally arranged back bow 9. When moving the top compartment lid 8, a drive device identified generally at 11 in the form of a hydraulic lifting drive acts such that the lowering movement (arrow B), illustrated in an exemplary fashion in FIG. 4, effects a pivot movement (arrow D) in the area of the hinge device 7 and, based thereon, a substantially horizontal push movement (arrow F) in the area of the locking device 10 is imparted to the top compartment lid 8.

For securing the folding top 2 in the top compartment 6 in its open position, a holding-down device 12 (FIG. 5) that is effective upon closing of the top compartment lid 8 is provided with which, in particular, the folded roof skin 3 with the rear window 4 is secured in a safe position within the top compartment 6 even at great driving loads.

Figure 3:
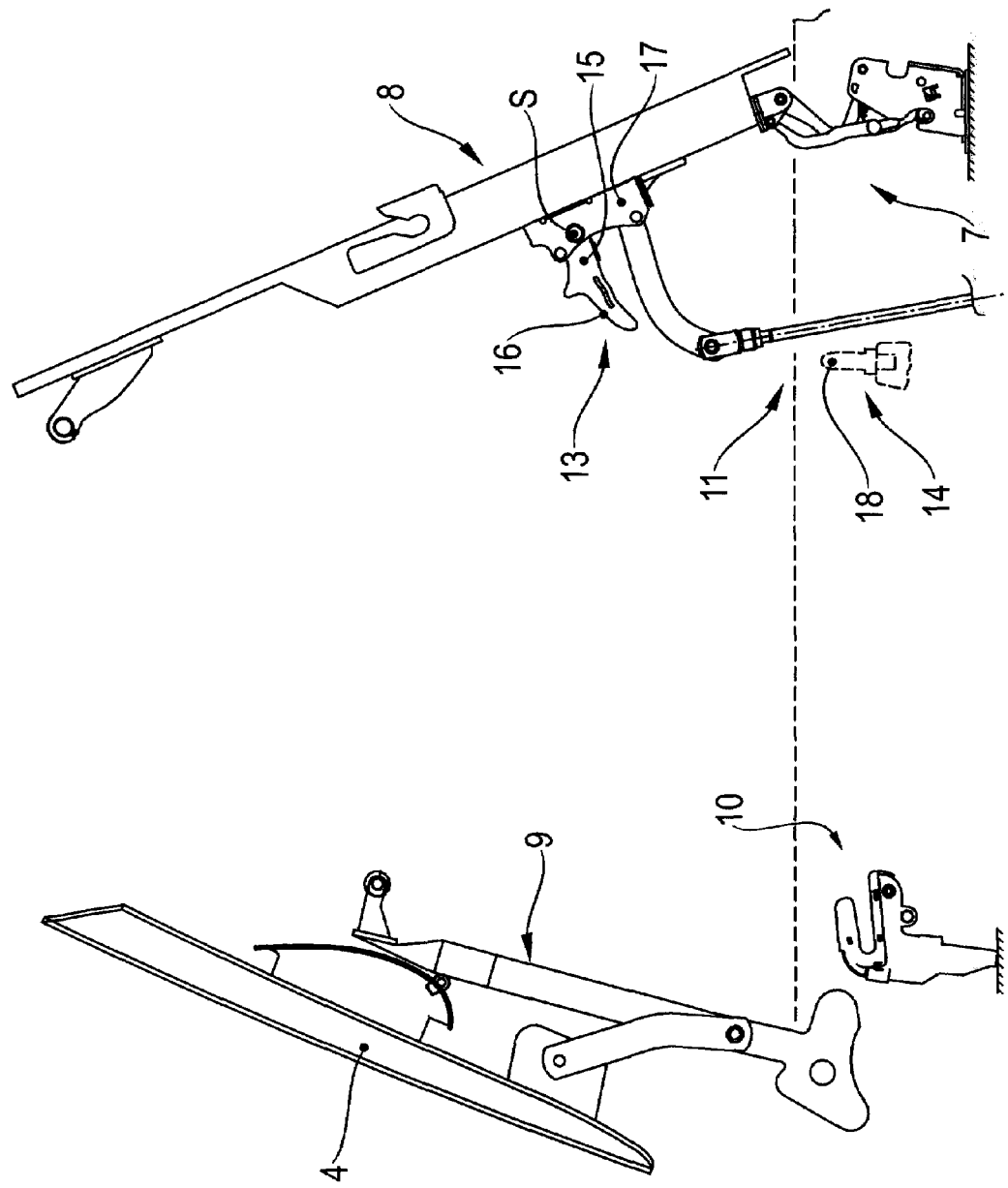
FIG. 3 a detail illustration similar to FIG. 2 with the top compartment lid in the open position when initiating a closing or opening process.

In the convertible vehicle according to the invention, the holding-down device 12 is formed by a counter member 13 supported on the top compartment lid 8 and a support part 14 connectable therewith when the top 2 is folded back. The principal illustrations according to FIG. 3 to 5 illustrate, when considering them as a whole, a step-wise sequence according to which the support part 14 and the counter member 13 can be moved jointly into the holding-down position (FIG. 5) by means of a connecting engagement present at least at times during closing of the top compartment lid 8.

Figure 4:
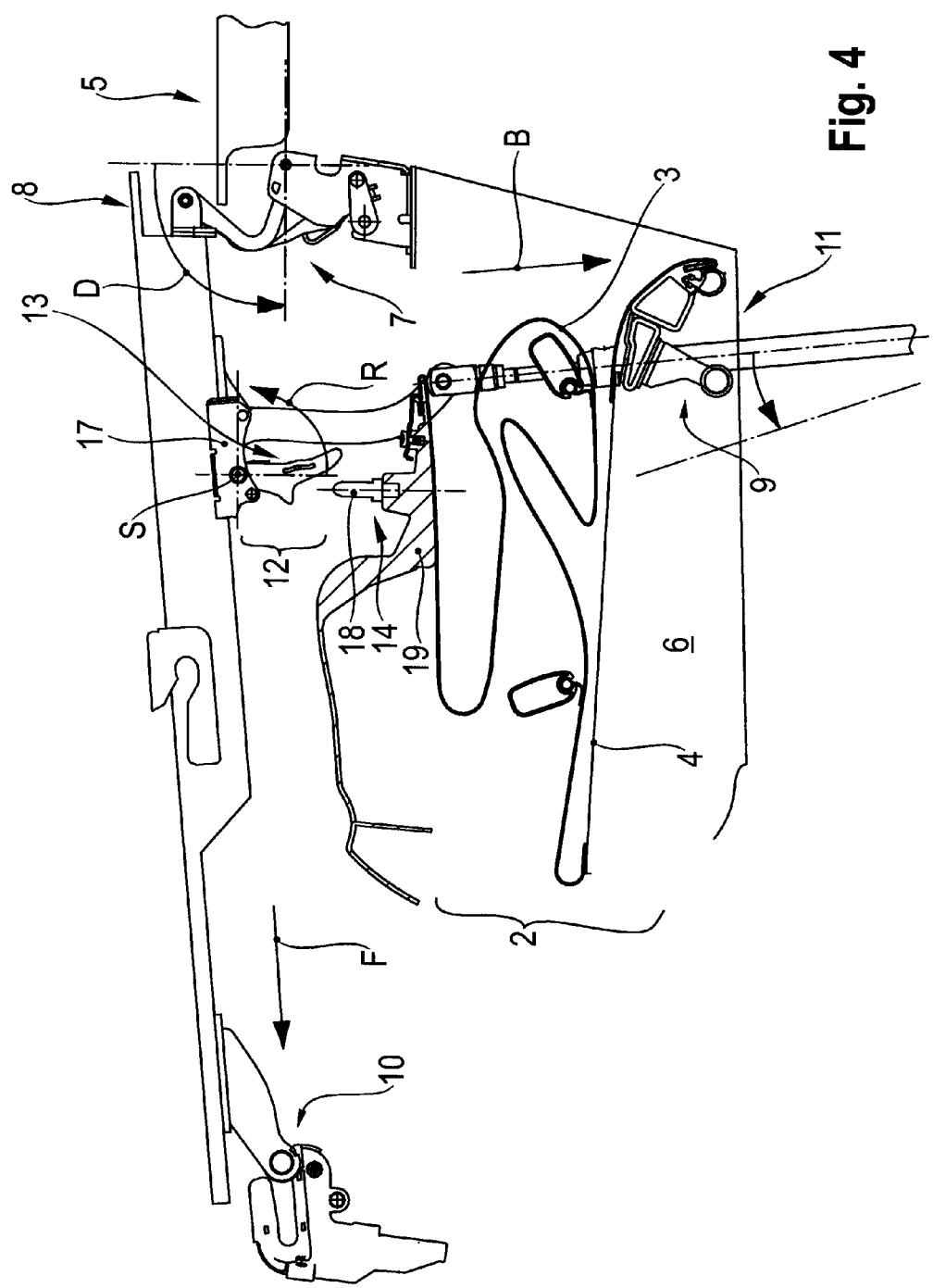
FIG. 4 a principal illustration similar to FIG. 2 with the folding top stowed in the top compartment as the top compartment lid closes.
Figure 5:
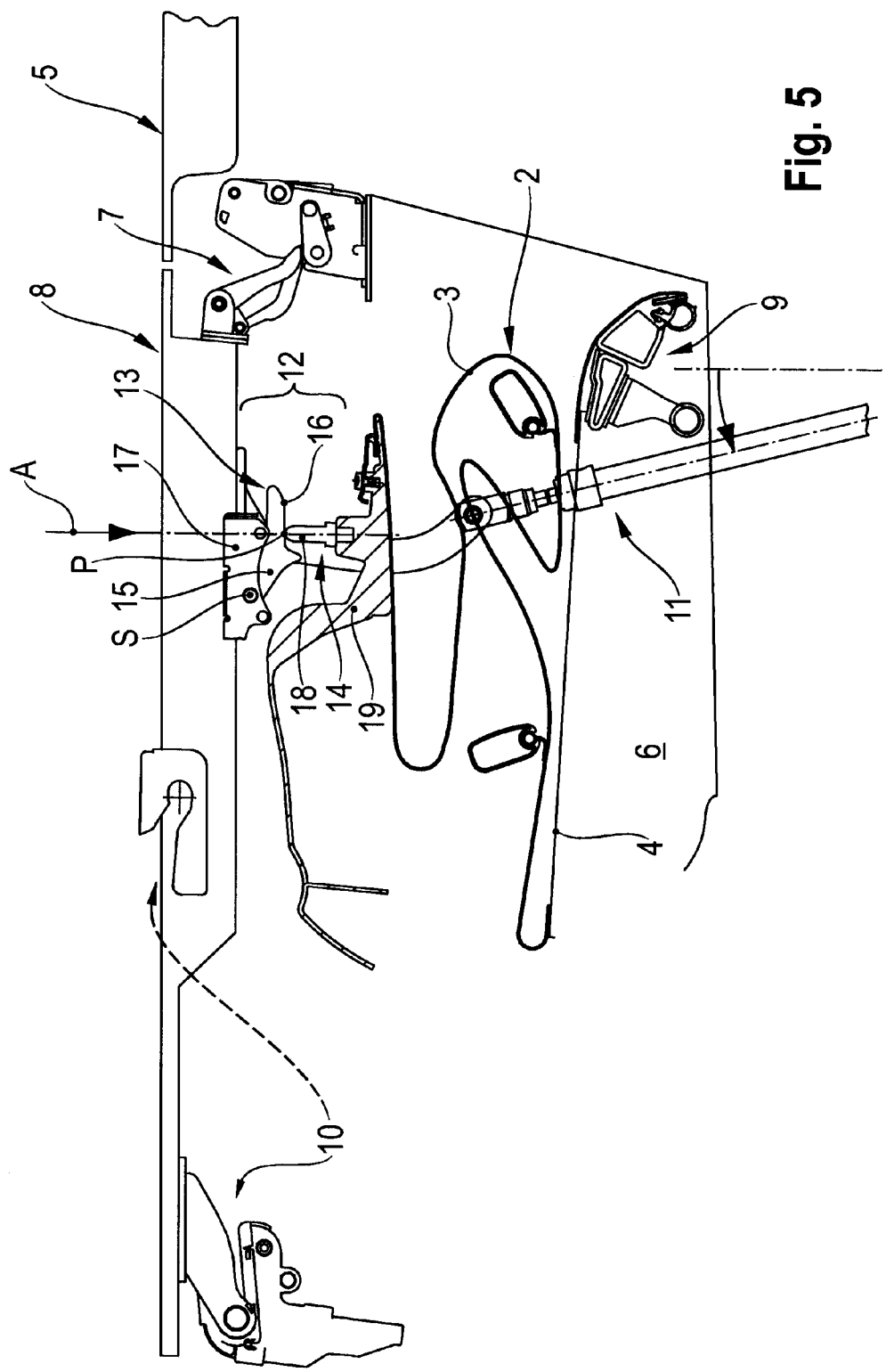
FIG. 5 a principal illustration similar to FIG. 4 with closed top compartment lid.

The transition phase from FIG. 4 to FIG. 5 shows that when the top compartment lid 8 closes, the counter member 13 provided thereat is moved toward the support part 14 provided on the top and extending essentially vertically (arrows D and F), that at the end of this pivot-push movement the counter member 13 realizes the connecting engagement on the support part 15 (illustrated in FIG. 4 shortly before contacting) and, subsequently, a relative movement (arrow R) between support part 14 and counter member 13 takes place so that the folding top 2 subsequently is covered by the top compartment lid 8 in the closed position and is secured by the holding-down device 12 (FIG. 5: contact pressure A at the point P).

This movement course shows that the kinematic mechanism of the drive on the top compartment lid 8 is adjusted relative to the counter member 13 movable therewith such that, when carrying out a closing or opening movement (corresponding to the reverse movement course, starting at FIG. 5 to FIG. 2), it is moveable at least phase-wise synchronously together with the top compartment lid 8.

The counter member 13 is formed in particular as a pivot support 15 that is pivotably supported on the underside of the top compartment lid 8 about a support axis S; its free end can be placed against the support part 14 that is movable together with the kinematic mechanism (not illustrated) of the top into the top compartment 6 and is secured therein essentially stationarily in the open position. The pivot support 15 resting against the support part 14 is pivotable into the joint holding-down position with the support part 15 (FIG. 5) by means of a substantially horizontal push component when moving the top compartment lid 8 in accordance with arrow F, wherein the contact pressure generated therewith is substantially variably adjustable.

The pivot support 15 has a shaped profile part 16 that can be moved against the support part 14 and has a support contour that provides a reliably reachable contact area so that in this way with minimal expenditure movement tolerances can be compensated within the multi-member kinematic mechanism of the top. It is also conceivable that in this area the parts resting against one another of the holding-down device 12 form a positive-locking connection (not illustrated) with which the pivot support 15 upon closing of the top compartment lid 8 can be entrained and returned into the vertical position illustrated in FIG. 2 when carrying out the opening movement.

In an expedient embodiment, the pivot support 15 is provided with a return element, not illustrated in detail and only schematically shown by arrow SP in FIG. 5, for example, a spring that retracts upon closing of the top compartment lid 8 and returns the pivot support 15 from the illustrated contact phase (FIG. 5) into the initial position (FIG. 3) relative to the top compartment lid 8.

The pivot support 15 is secured in the area of a support frame 17 on the top compartment lid 8 wherein in this area an additional receiving part (not illustrated can be provided as a securing means. It is also conceivable that, by means of the pivot support 15 received by movement, the holding-down force (arrow A) is changed and in this way the holding-down device 12 is adjusted specifically relative to the vehicle in regard to the folding properties of the stowed folding top 2.

In the illustrated embodiment of the two-part holding-down device 12, the holding-down device has a support part 14 for the pivot support 15 and a bolt 18 that can also be used particularly as of locking member and is supported as a part of the top closure on a forward transverse frame part 19 of the folding top 2. It is also conceivable in this connection that in place of the locking bolt 18 an additional component is attached on the transverse frame part 19 that is provided only as a support.

In reversing the described movability in the area of the pivot support 15, it is also conceivable that the support part 14 is embodied to be pivotable and/or adjustable and, in this way, an appropriate functional unit for securing the top 2 can be achieved.

The invention claimed is:

1. A convertible vehicle comprising:
a carbody;
a retractable top connected to the carbody;
a top compartment provided in the carbody, wherein the retractable top in a folded-down position of the retractable top is stowed in the top compartment;
a top compartment lid for closing the top compartment, wherein the top compartment lid extends within a rear carbody contour of the carbody;
a holding-down device arranged between the top compartment lid and the retractable top, wherein the holding-down device in a holding-down position is placed onto the retractable top stowed in the top compartment when closing the top compartment lid;
wherein the holding-down device comprises a counter member that is pivotably supported on the top compartment lid so as to be pivotable from a position parallel to the top compartment lid into a position perpendicular to the top compartment lid and further comprises a support part that is movable jointly with the retractable top and is connectable to the counter member in the folded-down position of the retractable top.

2. The convertible vehicle according to claim 1, wherein the support part and the counter member are transferred jointly into the holding-down position by a connecting engagement generated when closing the top compartment lid.

3. The convertible vehicle according to claim 1, wherein, when the top compartment lid is closed, the counter member is moved on a first movement path toward the support part provided on the retractable top, wherein at the end of the first movement path the counter member and the support part reach a connecting engagement causing a relative movement between the support part and the counter member and, subsequently, the retractable top is secured by the top compartment lid.

4. The convertible vehicle according to claim 1, wherein, when the top compartment lid carries out a closing movement or an opening movement, the counter member is imparted with a pivot-push movement carried out by the top compartment lid.

5. The convertible vehicle according to claim 1, wherein the counter member is embodied as a pivot support pivotably supported on a support axis on an underside of the top compartment lid, wherein the pivot support has a free end adapted to be placed against the support part that is substantially stationarily secured.

6. A convertible vehicle comprising:
a carbody;
a retractable top connected to the carbody;
a top compartment provided in the carbody, wherein the retractable top in a folded-down position of the retractable top is stowed in the top compartment;
a top compartment lid for closing the top compartment, wherein the top compartment lid extends within a rear carbody contour of the carbody;
a holding-down device arranged between the top compartment lid and the retractable top, wherein the holding-down device in a holding-down posiUon is placed onto the retractable top stowed in the top compartment when closing the top compartment lid;
wherein the holding-down device comprises a counter member pivotably supported on the top compartment lid and a support part that is movable iointly with the retractable top and is connectable to the counter member in the folded-down position of the retractable top;
wherein the counter member is embodied as a pivot support pivotably supported on a support axis on an underside of the top compartment lid, wherein the pivot support has a free end adapted to be placed against the support part that is substantially stationarily secured;
wherein the pivot support resting against the support part is pivotable by a substantially horizontal push movement of the top compartment lid into the holding-down position.

7. The convertible vehicle according to claim 5, wherein the pivot support comprises a shaped profile part engaging the support part.

8. A convertible vehicle comprising:
a carbody;
a retractable top connected to the carbody;
a top compartment provided in the carbody, wherein the retractable top in a folded-down position of the retractable top is stowed in the top compartment;
a top compartment lid for closing the top compartment, wherein the top compartment lid extends within a rear carbody contour of the carbody;
a holding-down device arranaed between the top compartment lid and the retractable top, wherein the holding-down device in a holding-down position is placed onto the retractable top stowed in the top compartment when closing the top compartment lid;
wherein the holding-down device comprises a counter member pivotably supported on the top compartment lid and a support part that is movable jointly with the retractable top and is connectable to the counter member in the folded-down position of the retractable top;
wherein the counter member is embodied as a pivot support pivotably supported on a support axis on an underside of the top compartment lid, wherein the pivot support has a free end adapted to be placed against the support part that is substantially stationarily secured;
wherein the pivot support comprises a restoring spring pivoting the pivot support relative to the top compartment lid.

9. The convertible vehicle according to claim 5, wherein the pivot support is secured by a support frame on the top compartment lid.

10. The convertible vehicle according to claim 5, wherein the pivot support has means that impart an adjustable holding-down force onto the retractable top.

11. The convertible vehicle according to claim 5, wherein the support part is a locking member of a top closure of the retractable top, wherein the locking member is supported on a forward transverse frame part of the retractable top.

* * * * *